L. D. KING.
PULLEY BLOCK.
APPLICATION FILED NOV. 1, 1915.

1,198,135.

Patented Sept. 12, 1916.

WITNESSES:
L. J. Forde.
B. M. Doolin.

INVENTOR
Lonzo D. King.
BY Strong & Townsend
ATTORNEYS

UNITED STATES PATENT OFFICE.

LONZO D. KING, OF RICHMOND, CALIFORNIA.

PULLEY-BLOCK.

1,198,135. Specification of Letters Patent. Patented Sept. 12, 1916.

Application filed November 1, 1915. Serial No. 59,021.

*To all whom it may concern:*

Be it known that I, LONZO D. KING, a citizen of the United States, residing at Richmond, in the county of Contra Costa and State of California, have invented new and useful Improvements in Pulley-Blocks, of which the following is a specification.

This invention relates to pulley blocks, and has for its object to simplify and improve the construction and operation of such devices, whereby to provide a pulley block adapted for heavy duty under any and all conditions, having means for preventing dust, grit, or other objectionable substances, from entering the sheave bearings and in which constant lubricating means are provided. In carrying out this object, I employ side plates connected together by a journal bearing, upon which is rotatably mounted a sheave, spacing rings carried between the side plates and journal bearing, and a lubricant box carried by one of the side plates, whereby oil is continuously fed to the bearing surfaces of the sheave.

One form of my invention is exemplified in the following description and illustrated in the accompanying drawing, in which—

Figure 1:
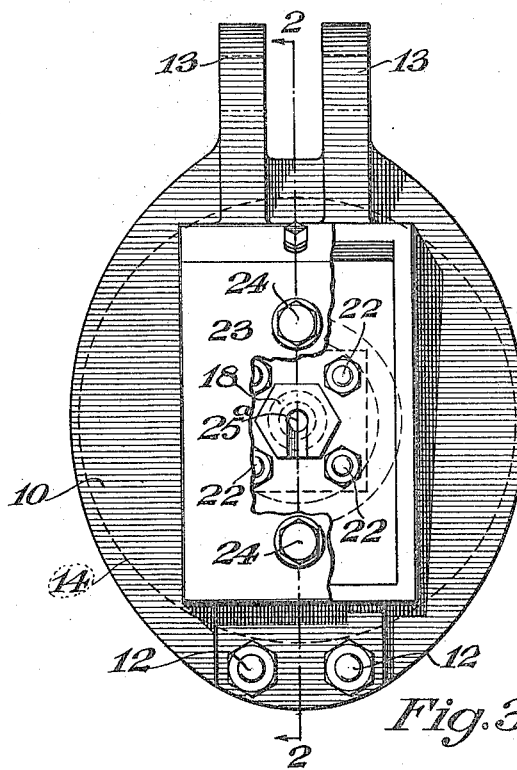
Figure 2:
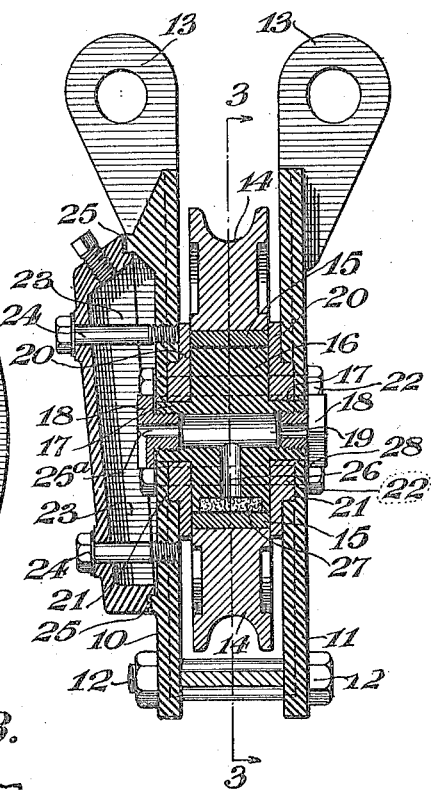
Figure 3:
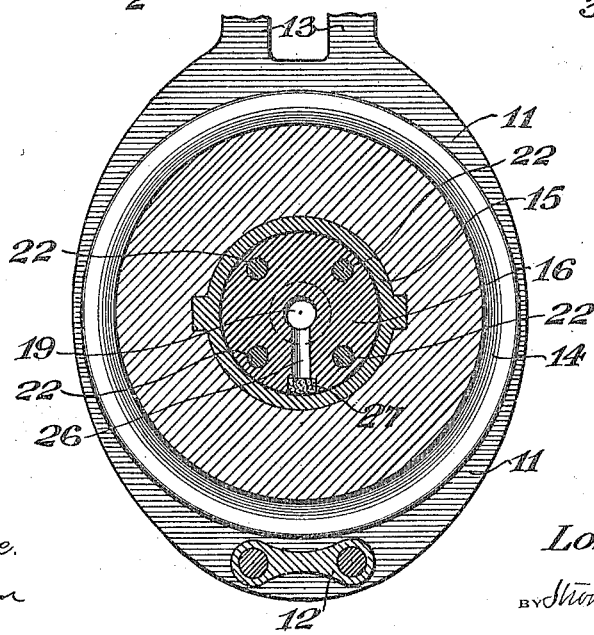

Figure 1 shows a side elevation of a device embodying my invention. Fig. 2 shows a sectional view, taken on line 2—2 of Fig. 1. Fig. 3 shows a sectional view, taken on the line 3—3 of Fig. 2.

In the drawing, side plates 10 and 11 are shown in spaced relation, connected together at one end by means of bolts and thimbles 12 and having extensions 13 at their other ends by which to suspend or connect the block as may be desired. One or more sheaves or pulleys 14 are employed, each provided with a bushing 15, of brass or other suitable material, to form a bearing, which bearing is adapted to be rotatably received upon a journal 16 carried by the side plates. The journal bearing, which is of comparatively large diameter, centrally, has reduced hub portions 17 each entering one of the side plates and held therein by means of screw caps 18, said caps each comprising an angular head portion resting against the side plate and an externally threaded stem screwed into a central bore 19 passing transversely through said journal.

Spacing rings 20, having bosses fitted in counter-sinks 21 on the interior faces of the side plates and provided with flanges to engage closely with the ends of the journal bearing and extending beyond the periphery of the bushing 15, prevent binding of the sheave and close the joints between the bearing surfaces. The spacing rings, in conjunction with the journal bearing, are secured, non-rotatably, in position between the side plates by means of four bolts 22 extending from plate to plate and provided with clamping nuts.

On one of the side plates is a lubricant box 23 inclosing the end of the hub cap 18 and surrounding portion and held in place by bolts or screws 24. A gasket 25 is fitted in the shouldered joints of the box and side plate to prevent leakage of oil and the inclosed hub cap has an oil aperture 25 leading to the central bore 19, and from the latter to the periphery of the journal bearing is a radial duct 26, by means of which oil is fed to the bearing faces of the rotatable bushing.

At the outlet orifice of the duct 26 I provide a duct 27 in the journal bearing to receive a sponge or waste material whereby to insure an even distribution of the oil. Held in place by the bolts 22 and lying between each hub cap and adjacent end of the journal bearing is a packing ring 28 to prevent the entrance of dust and grit to the bearing surfaces.

Such a device as I have described is extremely rugged and is particularly adapted for use where considerable dust, dirt and water are encountered as the close fitting parts prevent undue entrance of deleterious substances to the working parts, and the lubricating device increases the safety in this direction on account of oil being present at the joints to prevent the entrance of dust, etc.

Having thus described my invention, what I claim and desire to secure by Letters Patent is—

In a pulley block, a journal having reduced ends, a bushing on the center of the journal, a pulley on the bushing, spacing rings mounted on said reduced ends and extending across and over the bushing ends, side plates also mounted on said reduced ends of the journal, said side plates having countersunk portions on their inner faces, bosses on the rings received in said countersunk portions provided therefor in the inner faces of the side plates, bolts extending entirely through the side plates, bosses and journal, screw caps threaded in the journal ends and having heads which abut the side plates, one of the side plates having exterior shoulders, a lubricant box having shoulders which interfit with said first named shoulders, and means to secure the box to said side plate, one of the caps having a duct leading into said box.

In testimony whereof I have hereunto set my hand in the presence of two subscribing witnesses.

LONZO D. KING.

Witnesses:
JOHN H. HERRING,
W. W. HEALEY.

Copies of this patent may be obtained for five cents each, by addressing the "Commissioner of Patents, Washington, D. C."